United States Patent Office 3,405,120
Patented Oct. 8, 1968

3,405,120
LOW MOLECULAR CHONDROITIN SULFATE AND METHOD FOR MANUFACTURING THE SAME
Takehiko Kawano, Tadakazu Suyama, and Junji Nagai, Hirakata-shi, and Yoshiro Iga, Nishinomiya-shi, Japan, assignors to The Green Cross Corporation, Osaka, Japan, a corporation of Japan
Filed Dec. 30, 1966, Ser. No. 606,288
Claims priority, application Japan, Jan. 27, 1966, 41/4,880
11 Claims. (Cl. 260—234)

ABSTRACT OF THE DISCLOSURE

Commercially available chondroitin sulfate prepared from animal cartilage is hydrolyzed at a temperature ranging from 35° to 95° C. using hydrochloric acid, or oxalic acid having a final acid concentration of less than 1 N and during the reaction. Any contact of the reaction mixture with a metal surface must be avoided to prevent the resulting product from being discolored by metal. After the hydrolysis is complete, the pH of the resultant reaction mixture is adjusted to 4.5–5.5 with a weak alkaline reagent such as sodium carbonate, calcium carbonate or the like. The resultant low molecular weight chondroitin sulfate is charged with alcohol of at least 7 times the volume of the solution to precipitate and recover low molecular chondroitin sulfate as a powder having a molecular weight of about 4,000, an intrinsic viscosity of 0.1–0.3, and a unique pharmacological activity.

---

Figure 1:
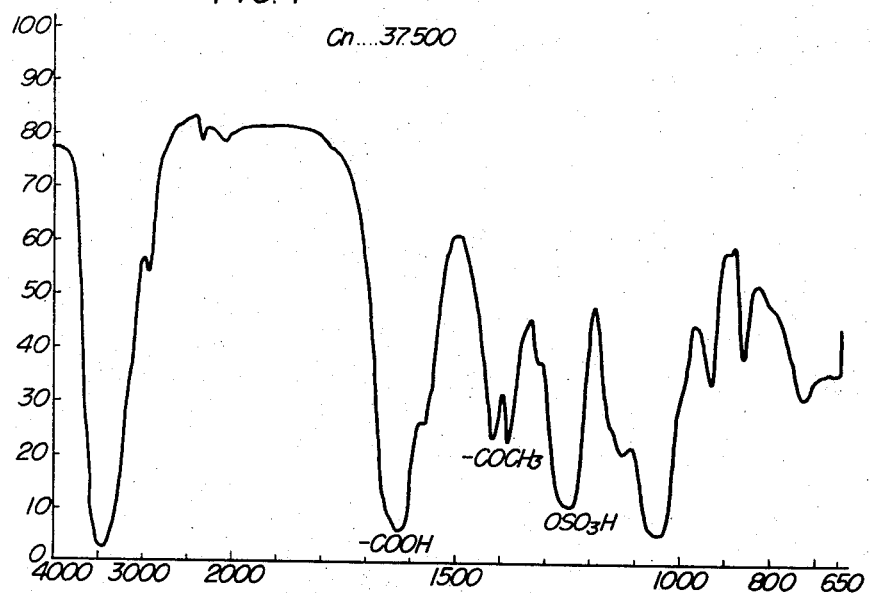

The present invention relates to a low molecular chondroitin sulfate of great effect for medical treatments and to a novel method for manufacturing the same. More particularly, the invention relates to a low molecular chondroitin sulfate preparation which is much more effective than any other conventional preparation for the prevention and treatment of atherosclerosis and inflammatory rheumatism, and for the recovery from cut and wound, and manufacturing method thereof. Chondroitin sulfate is a sulfuric acid ester of polysaccharide including N-acetyl-galactosamine and uronic acid in equimolar ratio, and its molecular weight, varying considerably with the manufacturing method employed, is generally in the range of between several million and tens of thousands. When the commercially available chondroitin sulfate preparations were analyzed by the method of S. M. Partridge et al. (cf. Biochemical Journal, vol. 79, pages 15–26, 1961) to determine their respective chain weight, it was found that the molecular weights of these preparations are in general in the order of 20,000–50,000. Such chondroitin sulfates have already proved to be effective for the prevention and treatment of auditory failure, the treatments of nephritis and nephrosis, and the treatments of hepatic disorder, neuralgia, rheumatism and eye diseases. However, it is thinkable by rights that in such a high molecular compound, the biological activity of the compound may differ in response to the amount of molecular weight.

One object of this invention is to provide a low molecular chondroitin sulfate, which is very effective for medical treatments and has an average molecular weight of about 2000 to about 6000.

An additional object of the invention is to prove a novel method of manufacture of the low molecular chondroitin sulfate whose mean molecular weight is about 2000 to about 6000.

After having the prospect that the biological activity of chondroitin sulfate may differ in response to the amount of molecular weight, the inventors have conducted a series of in vivo tests with the conventional, high molecular chondroitin sulfate preparations and with the low molecular chondroitin sulfates obtained by the novel process of this invention, and found that for the treatments of inflammatory rheumatism and arteriosclerosis and for the treatments of cut and wound, the low molecular chondroitin sulfate of the invention is far more effective than the conventional preparations. In deciding the treatment effects of these materials to the abovesaid diseases, the following test-methods were employed.

(A) Effects for atherosclerosis:
  (1) Lipemia-clearing test (method of Meng et al.: American Journal of Physiology, vol. 179, page 314, 1954)

This method comprises injecting intravenously chondroitin sulfate to an adult dog, taking blood after few minutes later from said injection, separating plasma therefrom, mixing the plasma with a fat emulsion of a definite composition, incubating the mixture of 37° C., and measuring the turbidity of said emulsion at the definite intervals in terms of extinction at 700 m$\mu$ to determine the activity of lipemia clearing factor in the plasma activated by the chondroitin sulfate employed.

(2) Biochemical and pathological tests for cholesterol dietary atheroscleorsis in rabbits Chondroitin sulfate was given to a rabbit being bred with cholesterol containing diet and its preventive and therapeutic effect for dietary atherosclerosis was determined by the various biochemical examinations such as total cholesterol in the plasma, C/P ratio, total cholesterol in the liver, total lipid in the liver, total cholesterol in the aorta, free cholesterol in the aorta and the like, and by the pathological examination of the aorta.

(B) Effect for inflammatory rheumatism:
  (1) Heat coagulation of protein (cf. method of Mizushima et al.; Arch. Intern. Pharmacodynamine, vol. 157, page 115, 1965)
  (2) Inhibition of formalin filter-paper granuloma (cf. method of Tanaka et al.; Endocrinologica Japonica, vol. 7, page 357, 1960)
  (3) Anti-bradykinin activity
  (4) Inhibition of passive cutaneous anaphylaxis
(C) Effect for acceleration of wound healing
  (1) Promotion of proliferation of fibroblast in tissue culture
  (2) Increase of wound tensile strength Test results were shown below in Tables 1–3.

TABLE 1.—EFFECT FOR ATHEROSCLEROSIS

| Molecular Weight | Plasma | | | Liver | | | Aorta | | | Effectiveness |
|---|---|---|---|---|---|---|---|---|---|---|
| | Total cholesterol | C/P ratio | Blood pressure | Weight | Total cholesterol | Total lipid | Macroscopic finding | Total cholesterol | Free cholesterol | |
| 31,000 | + | + | 0 | − | + | + | − | − | ± | + |
| 10,000 | ± | ± | 0 | − | − | ± | + | − | + | ± |
| 6,000 | ± | + | 0 | − | + | + | + | ± | + | + |
| 5,300 | ++ | ++ | 0 | ± | ++ | ++ | + | ++ | + | ++ |
| 4,000 | ++ | + | 0 | ± | ++ | ++ | + | ++ | + | ++ |
| 3,500 | ++ | + | 0 | + | ++ | ++ | + | ++ | + | ++ |
| 2,200 | ± | ± | 0 | − | ± | + | + | ++ | + | ++ |
| 800 | ± | ± | 0 | − | − | − | ++ | ++ | ++ | + |

In this Table 1 as well as in Tables 2 and 3, the percentage:

$$\frac{\text{Measured value in treated group}}{\text{Measured value in non-group}} \times 100$$

was calculated and classified in either of the following 5 grades:

Less than 69% ++ (very effective).
70–89% + (effective).
90–95% ± (fairly effective).
More than 96% − (not effective).
Nearly 100% 0.

TABLE 2.—EFFECT FOR INFLAMMATORY RHEUMATISM

| Molecular weight | Heat-coagulation of protein | Inhibition of formalin filter-paper granuloma | Anti-bradykinin activity | Inhibition of passive cutaneous anaphylaxis |
|---|---|---|---|---|
| 31,000 | − | + | − | − |
| 10,000 | − | ± | − | − |
| 6,000 | + | + | ± | + |
| 5,300 | ++ | + | + | + |
| 4,000 | +++ | + | + | + |
| 3,500 | ++ | + | + | + |
| 2,200 | + | + | + | + |
| 800 | − | + | + | − |

TABLE 3.—EFFECT FOR ACCELERATION OF WOUND HEALING

| Molecular weight | Proliferation of fibroblast | Increase of wound tensile strength |
|---|---|---|
| 31,000 | + | − |
| 10,000 | + | − |
| 6,000 | ++ | + |
| 5,300 | ++ | ++ |
| 4,000 | +++ | +++ |
| 3,500 | ++ | ++ |
| 2,200 | ++ | ++ |
| 800 | + | + |

Figure 2:
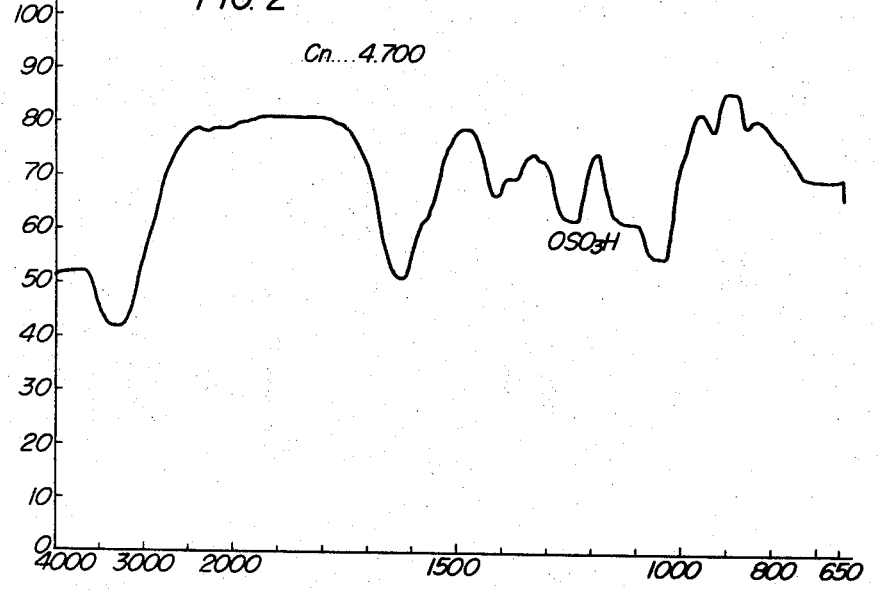

As the results of these tests, the inventors have found that the low molecular chondroitin sulfate having the molecular weight of 2000–6000 is far more effective for the medical treatments than the conventional chondroitin sulfate, whose molecular weight is about 20,000–50,000. With the decrease in the molecular weight of chondroitin sulfate, the metachromasis reaction, which is a characteristic of the compound, gradually disappears and the absorption of sulfuric ester radical in the infra-red absorption spectrum band gradually decreases as shown in appended FIGS. 1 and 2, and therefore the present compound is believed to be in the state just prior to losing the characteristics of chondroitin sulfate. In these drawings, the spectrum of FIG. 1 is of a commercial chondroitin sulfate and the spectrum of FIG. 2 is of the low molecular chondroitin sulfate of the present invention. The inventors also found that the chondroitin sulfate having the molecular weight of 800 has already lost the above said characteristics and the compound having the molecular weight of 10,000 has been slightly affected in the infrared absorption band.

As for the process for decreasing the molecular weight of chondroitin sulfate, it has been known that chondroitin sulfate is heated with a diluted acid solution. For example, in the Japanese patent publication No. 7,650/1964, it is described that chondroitin sulfate is heated at 100° C. for 108 hours with 0.05 N hydrochloric acid aqueous solution. However, such a method has many drawbacks and can not directly be employed in the present invention. That is, this method is not practical since there is the technical rub of maintaining at 100° C. for a long duration of time. Furthermore, the molecular weight of thus prepared chondroitin sulfate is only in the order of around 800, which is apparently outside the range of the present invention. Thus, the present chondroitin sulfate having an average molecular weight of about 2000 to about 6000 and being useful for medical treatments can not be prepared by any of the conventional method hitherto known.

The inventors have studied hard the corelation between the decomposition conditions and the molecular weight of the product and found the ideal conditions of using a higher concentration of acid, a lower temperature, and a shorter treating time to obtain an improved chondroitin sulfate having the molecular weight of about 2000 to about 6000 and having the least coloring property.

According to the studies of the inventors, it was found that a temperature of more than 95° C. should be avoided from the following reasons in the decomposition of chondroitin sulfate with an acid. That, is, when a temperature of more than 95° C. is employed, it is necessary to utilize a high pressure steam which in turn makes it difficult to maintain the decomposition temperature in a definite level. Furthermore, such a high temperature is improper since the decomposition reaction may proceed too rapidly to give the desired low molecular chondroitin sulfate. For example, in case of using 0.1 N hydrochloric acid solution, the commercial chondroitin sulfate may be decomposed to the compound having the molecular weight of about 2000 within 2 hours at such a temperature. From the practical viewpoint, it is desirable to settle the reaction time within 24 hours, preferably at around 10 hours. Though any concentration of acid may be employed in connection with the heating temperature and the time, it is advisable to employ 0.1 N–1 N acid in the invention from the easiness of subsequent neutralization and separation proceedures. Accepting the foregoing conditions, the lower limit of decomposition temperature must be fixed on 35° C., because a further diminished temperature can not give the desired product having the molecular weight of about 2000 to about 6000 even with 1 N acid and 24 hours' treatment. With respect to the coloring problem accompanied with the acid decomposition of chondroitin sulfate, it was found that it was not so significant up to the decomposition of giving the product having the molecular weight of 2000, but it became much severe as the decomposition proceeded in excess thereof. It was also found that even if the acid decomposition was carefully controlled to give the product of predetermined molecular weight, a darker product might be obtained in proportion to the increase in the employed reaction temperature and/or the employed reaction time. However, in spite of the aforesaid findings in the laboratory tests, the inventors also made such discovery that in the practical production of low molecular chondroitin sulfate there occurs a considerable coloring even with the product having the molecular weight of about 4000. As the cause of this phenomenon, it was found that the material of employed apparatus has a great influence in the coloring of the product. Therefore, in the apparatus employed in the acid decomposition, even a small part, such as, for example, stirrer and valve, must be strictly separated from metal providing contacting with the reaction mixture. It is likewise preferably to employ the apparatus made of non-metal or lined with non-metal material in any stage other than the acid decomposition step.

After treating the chondroitin sulfate under the aforesaid conditions, the reaction mixture is then quickly cooled to a room temperature and neutralized to stop the further progress of acid decomposition reaction. In this neutralization step, the pH of the reaction mixture is adjusted to 4.5–5.5 with an alkaline solution. If the pH exceeds the upper limit, the mixture gradually becomes colored in proportion to the increase in the pH value, and when the pH surpasses 7.0 its coloring grows abruptly worse.

As for the alkaline solution employed in the neutralization step, it is preferable to use an aqueous solution of weak alkali such as sodium carbonate and potassium carbonate. Strong alkali such as sodium hydroxide must be avoided since an undesirable coloring is generally brought about. We think this phenomenon may be due to the excessive increase in the pH value in the local spot of the reaction mixture.

After neutralization, thus obtained low molecular chondroitin sulfate solution generally contains salt of sulfuric acid derived from chondroitin sulfate in the acid decomposition step, excessively decomposed chondroitin sulfate, and other salts as well as the objective compound. Therefore, it is necessary to separate the objective compound from other impurities by using an appropriate precipitation method. Where ethanol is employed as a precipitator, success or failure of the said precipitation may have a close connection with the concentration of chondroitin sulfate in the original solution to be decomposed. When the concentration of chondroitin sulfate in the decomposed solution is less than 3%, there occurs no precipitation of the objective compound even though a larger quantity of ethanol is directly added to the solution, e.g., up to 90% (v./v.) based on the total volume of the solution. Therefore, if the concentration of chondroitin sulfate in the acid-decomposed and neutralized solution is too weak to precipitate the product, thus obtained solution must be concentrated before adding ethanol thereto. In this time, it is of course necessary to employ a vacuum distillation since an undesirable coloring of the solution may occur at a temperature of more than 50° C.

To the contrary, if the concentration of chondroitin sulfate in the beginning solution is more than 4%, acid-decomposed and neutralized solution can be directly added with ethanol to precipitate the objective low molecular chondroitin sulfate therefrom. In this case, in order to carry out an effective acid decomposition, it is necessary to pay attention that the employed acid concentration must be increased in proportion to the increase in the chondroitin sulfate concentration in the solution to be acid-decomposed. For example, if the beginning chondroitin sulfate concentration is 2%, the hydrochloric acid concentration must be 0.1 N, and if the former concentration is 10%, the latter concentration must be 0.3 N to decompose the commercial chondroitin sulfate at 75° C. and to give the product having the molecular weight of 4000 within 5 hours. When 0.1 N hydrochloric acid is employed for 10% chondroitin sulfate solution, even a longer heating time such as 24 hours is ineffective to give the objective low molecular chondroitin sulfate.

In case of employing 4% and over of chondroitin sulfate solution, the acid decomposed solution is neutralized and then added with 7–8 times volume of 95% (v./v.) ethanol to precipitate the low molecular chondroitin sulfate. Thus, the objective compound can be easily separated out from the accompanying impurities. The present low molecular chondroitin sulfate (M.W. 4000 ±2000) is also different from the conventional one having the molecular weight of around 800 from a viewpoint of intrinsic viscosity. For example, the intrinsic viscosity of the chondroitin sulface having average molecular weight of 4000 is 0.1–0.3 dl./g. while the intrinsic viscosity of the known product having the molecular weight of 800 is 0.03 dl./g. The following examples will further illustrate the invention, but are not to be construed as limiting its scope.

Example 1

650 liters of distilled water were placed in a glass-lined, closed tank equipped with jacket through which a heated water was circulated to maintain the temperature of said distilled water at 65°±1° C. 15 kg. of commercial chondroitin sulfate (average molecular weight: 29,000) were added and dissolved in the said water by using stirrer lined with glass. After dissolving, the solution was added gradually with 12.9 liters of 36% hydrochloric acid while stirring and then diluted with distilled water to make 750 liters of the mixed solution. At this stage, the acid concentration of this solution was 0.2 N. This solution was kept at 65±1° C. for 10 hours under mild stirring and then cooled rapidly by introducing cold water in the jacket. Thereafter, 125 liters of 4% aqueous sodium hydroxide solution were added gradually to adjust the pH of the solution at 4.8. Thus treated solution was then concentrated in vacuo to give about one half volume of the concentrate. 425 liters of thus obtained concentrate were added to 3400 liters of 95% ethanol while stirring, and the mixture was stirred for additional three hours. Thereafter, the precipitations were separated by using a bulk-skimming type centrifugal machine. The precipitate was again suspended in 95% ethanol to wash therewith, and centrifuged again. Thus separated precipitate was then spread over a thin tray and vacuum dried. By these procedures, 13.8 kg. of yellow, low molecular chondroitin sulfate (molecular weight: 3,700) were obtained.

Example 2

Employing the same apparatus as used in Example 1, 15 kg. of commercial chondroitin sulfate (average molecular weight: 31,000) were dissolved in distilled water at 80±1° C. To this solution, 6.75 kg. of oxalic acid were added and then the solution was diluted with distilled water to make 750 liters of the mixed solution, the acid concentration being 0.1 N. This solution was maintained at 80±1° C. for 12 hours while stirring mildly, cooled and added with 8.0 kg. of calcium carbonate portion by portion. With the addition of said calcium carbonate, there appeared the precipitation of calcium oxalate and the pH of the solution reached 5.1. After separating the precipitate with the leaf-type filter precoated with filtering aid, the filtrate was vacuum concentrated at 40° C. to about one half of the original volume and added with eight times volume of 95% ethanol to precipitate the objective compound. After separation, the precipitate was washed with 95% ethanol, and vacuum dried. Thus, 11.4 kg. of white, low molecular chondroitin sulfate (molecular weight: 3,300) were obtained.

Example 3

Employing the same apparatus as used in Example 1, 40 kg. of commercial chondroitin sulfate (average molecular weight: 31,000) were dissolved in 650 liters of distilled water at 73° C., and then 11.2 liters of 36% hydrochloric acid were added thereto. (Acid concentration was 0.2 N at this stage.) While stirring mildly, this solution was kept at 73±2° C. for 8.5 hours, and then cooled and added with 6.8 kg. of sodium carbonate. At this point, the pH of the solution was 4.6. This solution was added with 7 times volume of 95% ethanol and the precipitate was separated, washed with ethanol and vacuum dried. 37 kg. of white powder of low molecular chondroitin sulfate (molecular weight: 4,400) were obtained. Various analysis data of this product were shown below.

TABLE.—ANALYSIS DATA

| Item | Result | Note |
| --- | --- | --- |
| Elson-Morgan reaction | + | |
| pH | 5.46 | As 1% solution. |
| NaCl content, percent | 0.76 | |
| Ca++ | | |
| Heavy metals, p.p.m | <20 | U.S.P. |
| As, p.p.m | <10 | U.S.P. |
| Color | 0.055 | $E_5$ cm.$^{1\%}$ (450 m$\mu$). |
| Chain-weight | 4,400 | |
| Chondroitin-sulfate content, percent | 88.9 | By Carbazole reaction. |
| Loss on drying, percent | 2.27 | U.S.P. |
| Residue on ignition, percent | 26.88 | U.S.P. |

As described hereinabove, the low molecular chondroitin sulfate having a molecular weight of about 2000 to about 6000 is a novel and useful compound for medical treatments and a practical manufacturing method has been established by the inventor.

What we claim is:

1. Low molecular chondroitin sulfate having average chain-weight of about 2000 to about 6000.

2. Low molecular chondroiting sulfate having average chain-weight of 4000 and intrinsic viscosity of 0.1–0.3 dl./gram.

3. A method for manufacturing chondroitin sulfate having average molecular weight of about 2000 to about 6000 which consists essentially of hydrolyzing commercial chondroitin sulfate with concentrated acid at a temperature of 35–95° C. up to the product having the average molecular weight of around 4000, neutralizing to a weak acidic condition, precipitating the product and recovering the same.

4. A method according to claim 3, wherein the said hydrolysis is conducted while preventing the contact of reactant with metal.

5. A method according to claim 3, wherein the said concentration of acid is 0.1–1 N.

6. A method according to claim 3, wherein the said acid is selected from the group consisting of hydrochloric acid and oxalic acid.

7. A method according to claim 3, wherein the said hydrolysis is carried out for about 10 hours.

8. A method according to claim 3, wherein the said precipitating step is carried out by mixing the hydrolyzate with alcohol.

9. A method according to claim 3, wherein the said recovered product is subjected to vacuum drying.

10. A method according to claim 3, wherein the said neutralization is carried out by treating the hydrolyzate with a weak alkali selected from the group consisting of sodium carbonate and calcium carbonate up to pH 4.5–5.5.

11. A method for manufacturing chondroitin sulfate having average molecular weight of about 2000 to about 6000 which consists essentially of hydrolyzing commercial chondroitin sulfate with 0.1–1 N oxalic acid at a temperature of 35–95° C. for 10 hours, neutralizing the hydrolyzate with calcium carbonate to a weak acidic condition, separating the precipitated calcium oxalate, adding alcohol to the filtrate to precipitate the product and recovering the same.

References Cited

UNITED STATES PATENTS

| | | | |
|---|---|---|---|
| 2,959,583 | 11/1960 | Doczi | 260—234 |
| 3,175,942 | 3/1965 | Anderson et al. | 260—234 |

OTHER REFERENCES

"Chem. Abst.," vol. 51, 1957, p. 9098(d).

LEWIS GOTTS, *Primary Examiner.*

JOHNNIE R. BROWN, *Assistant Examiner.*